United States Patent
Casadei

(10) Patent No.: US 8,997,448 B2
(45) Date of Patent: Apr. 7, 2015

(54) SUPPORTING AND GUIDING DEVICE FOR POWER LINES FOR EXCAVATION DEVICES

(75) Inventor: Giovanni Casadei, Cesena (IT)

(73) Assignee: Soilmec S.p.A., Cesena (IT)

(*) Notice: Subject to any disclaimer, the term of this patent is extended or adjusted under 35 U.S.C. 154(b) by 225 days.

(21) Appl. No.: 13/492,487

(22) Filed: Jun. 8, 2012

(65) Prior Publication Data
US 2012/0312933 A1    Dec. 13, 2012

(30) Foreign Application Priority Data

Jun. 8, 2011 (IT) .............................. TO2011A0502

(51) Int. Cl.
| | |
|---|---|
| F16G 13/00 | (2006.01) |
| F16G 13/16 | (2006.01) |
| E02F 3/20 | (2006.01) |
| E02D 17/13 | (2006.01) |
| E02F 3/22 | (2006.01) |
| E02F 9/22 | (2006.01) |

(52) U.S. Cl.
CPC ................ *E02F 3/205* (2013.01); *E02D 17/13* (2013.01); *E02F 3/22* (2013.01); *E02F 9/2275* (2013.01); *F16G 13/16* (2013.01)

(58) Field of Classification Search
USPC ......................................... 59/78.1; 248/49, 51
See application file for complete search history.

(56) References Cited

U.S. PATENT DOCUMENTS

| | | | |
|---|---|---|---|
| 3,382,668 A | 5/1968 | Berkes et al. | |
| 4,057,969 A | 11/1977 | Rochmann | |
| 4,742,876 A | 5/1988 | Barthelemy et al. | |
| 6,367,238 B1 * | 4/2002 | Fischer | 59/78.1 |
| 6,708,480 B1 * | 3/2004 | Wehler | 59/78.1 |
| 7,845,154 B2 * | 12/2010 | Arzberger et al. | 59/78.1 |
| 7,845,155 B2 * | 12/2010 | Jaeker | 59/78.1 |

FOREIGN PATENT DOCUMENTS

| | | |
|---|---|---|
| DE | 30 45 901 | 7/1982 |
| EP | 0 518 292 | 12/1992 |
| EP | 0 708 270 | 4/1996 |
| EP | 1 319 865 | 6/2003 |

OTHER PUBLICATIONS

Italian Search Report for Italian Application No. TO 2011A000502 mailed Jan. 5, 2012.

* cited by examiner

*Primary Examiner* — David B Jones
(74) *Attorney, Agent, or Firm* — Merchant & Gould P.C.

(57) ABSTRACT

A supporting and guiding device for power lines 2 is intended for use in association with an excavation tool 15 mounted on a drilling machine 1. The device is formed by at least one supporting branch 4, having spacer elements 3, wherein a cable 16 is inserted into at least one housing in said spacer 3, and at least one supply hose 22 for the at least one line 2. The supply hose 22 contains hydraulic hoses and/or electric cables for signal transmission. The device includes transversal connection elements or cross members 42 which are adapted to support supply hoses 22 and are connected to the branch 4. Cable 16 of branch 4 runs through each spacer 3; also, the same cable 16 is subject to a preload generated by the insertion of at least one tensioning element.

16 Claims, 15 Drawing Sheets

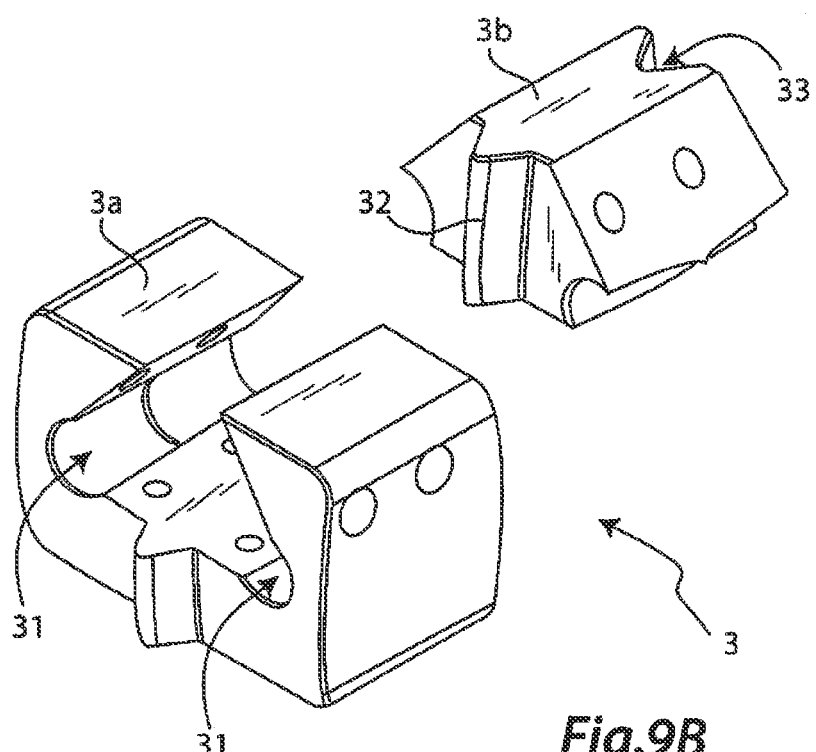

SUPPORTING AND GUIDING DEVICE FOR POWER LINES FOR EXCAVATION DEVICES

This application claims benefit of Serial No. TO 2011A000502, filed 8 Jun. 2011 in Italy and which application is incorporated herein by reference. To the extent appropriate, a claim of priority is made to the above disclosed application.

BACKGROUND

The present invention relates to a supporting and guiding device for power lines, e.g. hydraulic oil circuits and/or electric instrumentation circuits, for an excavation device, e.g. a hydromill, to be mounted preferably on cranes, cable-type excavators or drilling machines for creating diaphragms in the ground.

It is known that in the ground drilling industry, in particular in the diaphragm field, excavation devices are generally used which are handled by means of a cable-type hoisting device.

In the case of a hydromill, which is normally used for creating diaphragms, it is necessary to handle a series of power lines, such as, for example, hydraulic oil hoses and electric instrumentation and control cables, which are generally also inserted into hydraulic hoses or anyway have particular construction characteristics that make them compatible with the work site.

Said hoses and cables are wound around a drum of a drawworks which, by turning, winds or unwinds them as necessary based on the movements required for the excavation process.

When depths are significant, indicatively over 100 meters, the length and weight of the hoses may reach considerable values, thus making it necessary to guide and support them in order to prevent them from becoming entangled as they go up and down during the excavation process, as well as to avoid that an excessive pulling force, generated by their own weight, might cause excessive stretching of the hoses and cables, which in some cases might lead to undesired failures. In fact, said hoses and cables, if too elastic, will cause the handling system to no longer be able to promptly react to the wind/unwind commands issued by the drawworks drum, resulting in problems of incorrect winding.

In addition, again due to the weight of the hose itself, when said hoses are wound around the drawworks drum each hose coil is subject to heavy pressures generated by the weight of all the next coils which are wound over it.

As a result, the innermost coil, i.e. the smallest diameter one directly wound over the drum, is subject to a very high pressure.

It is therefore necessary to constrain said hoses to one another, so that they can be wound in an orderly manner without undergoing structural damage, such as compression, and to guide them in such a way as to avoid any entanglement between hoses and/or cables as they are being moved.

European patent EP0518292 has disclosed an excavation device, e.g. a hydromill, wherein the power line hoses are kept spaced and parallel by transversal bars secured along the hoses at regular intervals; said bars are kept at the proper distance by suitable profiled spacers, thus creating two supporting branches.

The terminals of the bars and the profiled spacers are run through by one cable per branch.

In order to prevent the spacer elements wound on the drum from becoming misaligned, they are fitted with a tooth and a recess having complementary shapes, such that they will match perfectly when wound on the drum.

Each profiled spacer already wound on the drum acts as a guide by directly coupling its own tooth to the matching recess of the spacer being wound; the latter, in its turn, will perform the same guiding function for the next spacer.

When the hoses are unwound into the excavation, the whole weight of the hoses and of the spacer elements is borne by the two side cables.

When the weight acting upon the cables becomes considerable as the excavation process goes on, the cables themselves are progressively stretched up to the point where the profiled spacers crowd together at the bottom due to their own weight.

In this condition, the spacer elements are no longer guided and can rotate about the cable's axis and take anomalous positions.

The rotation of said spacer elements may be caused by vibrations, which are always present during an excavation, or simply by movements of the drilling machine or of the tool thereof.

Rotation of the spacer elements is essentially due to their own shape; in fact, said elements are parallelepipedons lacking any axial symmetry, and therefore are subject to torques.

Following the rotation of one or more spacer elements, when the hoses are rewound on the drum it may happen that they get stuck on the idle pulley, thus preventing any further rewinding.

Likewise, in the section from the winding drum to the idle pulley at the top of the crane arm, it may happen that the spacer elements no longer in contact with each other get closer to each other after having undergone rotations, thereby taking an anomalous position.

Said anomalous position will prevent arranging the spacers in the appropriate configuration as they are wound on the drum.

Also, these rotations may create gaps between consecutive spacer elements, thus complicating, or even preventing, the step of pulling the hoses through the idle pulley.

It is also known, from European patent EP0708270, a support chain for a hose, which is used for guiding the hose that drains the mud and debris coming from the hydromill.

In the device described in European patent EP0708270, the hose spacing or guiding elements, which are preferably U-shaped, are run through by two side cables.

In this manner, any rotation of the guiding elements about the hose axis is prevented by the symmetry of the structure, due to the presence of specularly arranged cables.

In the operating configuration wherein the hose is at the bottom of a deep excavation, the weight borne by the two cables becomes substantial in relation to the strength of the cables themselves.

Under the action of this weight, the cables are subject to stretching that creates a gap, or interspace, between the idle pulley and the last hose guiding element, because the guiding elements slide along the cables under their own weight and get stacked one over the other at the bottom.

This sliding of the spacer elements is problematic, in that it may cause strong vibrations when the hose is recovered and, in some cases, it may cause one or more U-shaped elements, or even the idle pulley, to fail.

Finally, it is known from U.S. Pat. No. 7,845,154 a device adapted to guide and support the weight of a set of hoses for power lines, e.g. for a hydromill.

Said device is formed by two chain branches, connected by transversal bars to the hoses, which are kept at the desired distance by a series of spacer elements, each of which is run through by at least one pair of cables.

In the art prior to this patent, each branch is usually constituted by a single main supporting cable, inserted in the main hole.

Said patent makes an attempt to solve the problem of rotation of the spacer elements when the cable is wound on the drum or when the branch is suspended vertically along the excavation.

As described in the patent, in order to overcome this problem it is possible to insert into each branch a second cable, placed in a suitable hollow housing, for the purpose of preventing the elements from rotating.

In view of the function it performs, this second cable is always thinner than the main cable, because it must not bear any suspension or support load.

Said second cable also runs through all the spacer elements comprised in the branch.

Another problem arises in this case as regards the alignment and spacing of the spacer elements, which is due to the fact that, under the considerable weight of the hoses and of all the suspended parts, the absorption of axial loads by the two cables is inversely proportional to their rigidity.

The maximum stretching undergone by the two cables, however, will only be associated with that of the supporting cable.

When the absorption cables are stretched, the second cable, i.e. the thinner one, will turn out to be loose, thereby allowing the spacer elements to rotate about the hole corresponding to the axis of the supporting cable.

In addition, said solution does not solve the above-mentioned problem of the downward stacking of all the spacers present in the branches extending from the drawworks drum to the upper pulley of the crane arm.

This last patent does not even solve the problem of the repeated descent of the spacers into the excavation when the cable is progressively stretched and the spacers get stacked at the bottom, due to their own specific weight.

SUMMARY

The present invention aims at solving the above-mentioned problems by providing a guiding device for power lines for a hydromill. The spacer elements stay close to one another when the cables are particularly stressed in operation, thus avoiding the formation of gaps in between.

Said spacer elements are not allowed to rotate about their own axis, and therefore arrange themselves in a predetermined correct position.

Furthermore, the system according to the present invention is suitable for reaching increasing depths.

One aspect of the present invention relates to a supporting and guiding device for power lines for excavation devices.

BRIEF DESCRIPTION OF THE DRAWINGS

The features and advantages of the supporting and guiding device according to the present invention will become more apparent from the following description and from the annexed drawings, wherein:

FIG. 2A shows the spacer to be inserted into a supporting branch, FIG. 2B shows a first variant of the spacer of FIG. 2A, FIG. 2C shows a second variant of the spacer of FIG. 2A, FIG. 2D shows the cross-section of a spacer according to the present invention;

FIG. 3A is a plan view of a supporting branch, and FIG. 3B is a side view of the supporting branch of FIG. 3A;

FIG. 5A is a three-dimensional view of a tensioning element, FIG. 5B is a three-dimensional view of a tensioning element complementary to the element of FIG. 5A, FIG. 5C shows some alternative embodiments of the spacer of FIG. 5A, FIG. 5D shows some alternative embodiments of the element of FIG. 5B;

FIG. 6A shows a hose-carrying cross member as a whole, and FIG. 6B shows a three-dimensional view of a dovetail joint between tensioning elements and a cross-member;

FIG. 7A shows a three-dimensional view of the cross member and of the block, and FIG. 7B shows a three-dimensional view of the same block secured to the same cross member;

FIG. 8A shows a side view of a branch comprising said cross member with a new variant of spacer elements, and FIG. 8B shows a sectional view of a detail of the cross member comprised in the branch of FIG. 8A;

FIGS. 9A and 9B illustrate further variants of the spacer comprised in the device according to the present invention.

DETAILED DESCRIPTION

Figure 1:
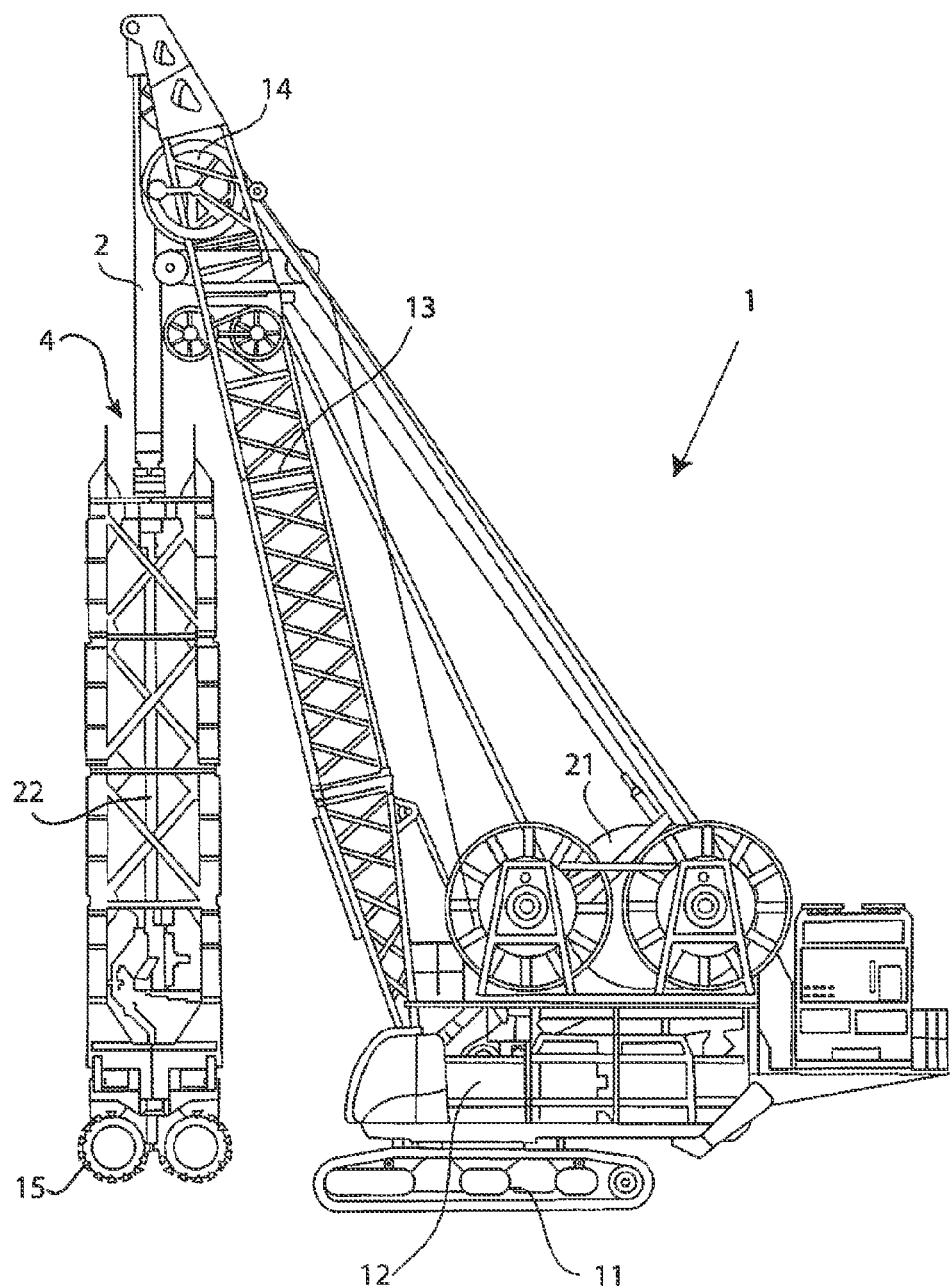
FIG. 1 shows a general view of a diaphragm drilling machine with an excavation tool fitted with cutting wheels, whereon a hydraulic power line is installed which comprises the supporting and guiding device according to the present invention.

With reference to the above-listed drawings, the invention relates to a supporting and guiding device for power lines 2 intended for use in association with an excavation tool 15, e.g. fitted with cutting wheels positioned under the frame and with a horizontal axis, and mounted on a drilling machine 1, preferably for creating diaphragms.

Said drilling machine 1 is preferably formed by an undercarriage 11 surmounted by a rotary tower 12 and a lattice arm (13).

Figure 4:
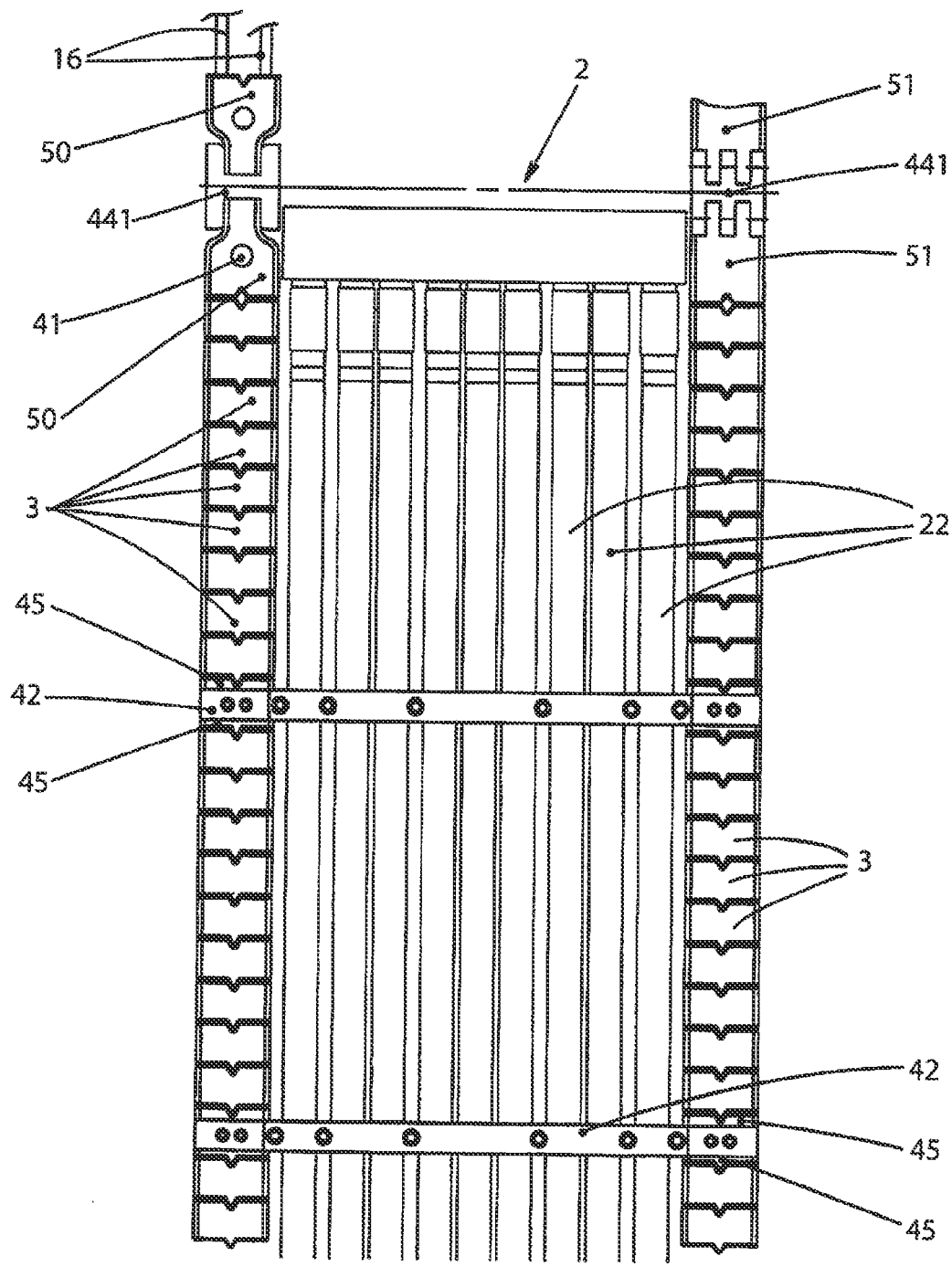
FIG. 4 is a front view of the assembly of the device according to the present invention, comprising two supporting branches, hoses and cross members.

Said power device 2 is formed by at least one supporting branch 4 as shown in FIG. 4, consisting of a plurality of spacer elements 3, wherein a cable or tension line 16 is inserted into at least one housing comprised in said spacer 3, and at least one supply hose 22 for said at least one line 2.

Said at least one supply hose 22 contains, for example, hydraulic hoses and/or electric cables for transmitting signals and/or supplying power.

The supporting and guiding device comprises transversal connection elements or cross members 42 adapted to support supply hoses 22 and connected to said at least one branch 4.

In the device according to the present invention, the cable or tension line 16 of said at least one supporting branch 4 runs through every spacer 3; also, the same cable 16 is subject to a preload generated by inserting at least one tensioning element, e.g. tensioning axial spacers 45, in a manner such that all spacers 3 crossed by said cable 16 are kept in contact with each other, thereby being prevented from rotating about the axis of cable 16 even when said cable 16 is stressed while machine 1 is operating, e.g. because of the loads involved.

The present invention is preferably used as equipment of a diaphragm drilling machine 1, typically a line or crane excavator, or a vertical-tower tracked drilling machine.

Said at least one hose 22, when lengths are great for reaching maximum depths, is divided into elements having a given length corresponding to the length dimension used in production. The length of each element of hose 22 may also depend on modularity, so as to obtain specific final lengths from combinations of shorter lengths, on the transport conditions of hoses 22, or on the cost of the solution as a whole.

Generally it is possible to obtain, starting from hose elements 22 having variable lengths from 20 m to 60 m, hoses 22 for power lines 2 adapted to reaching depths from 100 m to 300 m. The electric cable placed inside hose 22 can be either made as one piece or subdivided into a number of sections equal to the number of hose elements 22.

Said cross members 42 comprised in the supporting and guiding device are adequately separated by a plurality of spacers 3.

Said cross members 42 comprise at least one housing 420, preferably cylindrical in shape, which is adapted to hold hoses 22. Said housings 420, in one non-binding embodiment, are preferably equidistant, thus creating an orderly array of hoses 22.

The number of spacers 3 comprised in the supporting and guiding device is therefore dictated by the depth of the excavation to be made, by the number of installed cross members 42, and by the mounting pitch of the latter.

Preferably, the device according to the present invention comprises two supporting branches 4 kept equidistant from a plurality of cross members 42 connected thereto.

In each one of the two supporting branches 4 there is at least one cable or tension line 16, which performs both the function as a support for the weight of that part of device according to the present invention which is located downstream of branch section 4 and the function of keeping spacers 3 aligned, in that it prevents them from rotating about the longitudinal axis of cable 16.

Spacers 3 of each branch 4 are preferably equipped with at least two through housing 31 for cable 16, said cable forming a closed path.

Preferably, for each branch portion 4, cable 16 first crosses all the spacers through a first housing 31', e.g. the right one, and is then routed to one end of branch portion 4 in order to cross again all spacers 3 in the opposite direction by passing through the second housing 31'', e.g. the left one.

Cable or tension line 16, therefore, crosses each spacer 3 at least twice by passing through at least two distinct housings 31, thus forming a closed path.

A first method of installation of the supporting and guiding device according to the present invention comprises the following steps:
  assembling at least one supporting branch 4,
  positioning at least one fastening element for at least one hose 22 for the power lines,
  preloading at least one cable 16 comprised in said at least one branch 4,
  securing hoses 22 for power lines 2.

In the step of assembling at least one supporting branch, two branches 4 are preferably made by inserting, for each branch, at least one cable or tension line 16 into through housings 31 comprised in spacers 3. During this step, cable 16 is conveniently left loose in order to facilitate the maneuvers for positioning spacers 3.

The length of cable 16 takes into account the dimensions of the elements for fastening hoses 22, such as, for example, the cross members 42 and any tensioning axial spacers 45 suitably having a different thickness than spacers 3.

The step of assembling at least one branch 4 is followed by the step of positioning at least one fastening element for at least one hose 22, wherein a plurality of cross members 42 are connected between said two supporting branches, said cross members 42 being adapted to guide and secure the hydraulic hoses and/or the electric cables contained in hoses 22 and being spaced by a predefined number of spacers 3 for each branch 4.

Said cross members 42 are advantageously provided in the form of a clamp and can be mounted to cable 16 even when the latter has already gone through all the spacers 3 and has already been closed, e.g. in a loop-like fashion.

The step of positioning at least one fastening element for at least one hose 22 is followed by the step of preloading at least one cable 16, wherein the required preload is applied to cable 16 of each branch 4.

Finally, the preloading step is followed by the step of securing hoses 22 of power lines 2.

A further variant of the installation method begins with the step of securing hoses 22 by means of the fastening elements, followed by the step of assembling branches 4 by installing cable 16 with spacers 3, and finally by the step of preloading cables 16 by adjusting the axial position of the cross members 42, which may also act as tensioning elements.

Yet another method for mounting the supporting and guiding device provides for initially assembling branches 4, followed by a first step of preloading cable 16; the step of securing hoses 22 to the fastening elements is then carried out, followed by the step of positioning the fastening elements and, finally, by a second step of preloading cable 16.

In all the above-mentioned mounting methods, during the step of securing hoses 22 the latter are left loose relative to cables 16.

This solution will allow channeling the increased load acting upon cables 16, when machine 1 comes in operation, without stressing hoses 22, which are mounted loose to cross-sections 42, thereby preventing said hoses 22 from suffering any damage.

When mounting the device according to the present invention, if the last cross member 42 is required to generate the partial or final preload on the cables 16 of branch portion 4, spacers 3 adjacent to said last cross member 42 are advantageously kept apart in order to facilitate the insertion of cross member 42.

The value of the preload applied to cable 16 depends on the weight to be borne by each branch 4 or portion thereof, in particular the weight that each section composing each branch 4 will have to bear.

The weight of each branch section 4 is given by the mass of all the suspended devices present downstream of branch section 4 under examination, assuming also that: the hydraulic hoses will be full of oil; movements may encounter hydraulic resistance due to the shapes of power line 2, as well as resistance related to speed of motion, degree of adhesion between the fluid and power line 2 itself, and all known actions which are found in applications like those described herein.

Considering this, it is possible to use different preload values depending on branch section 4 involved. Those sections which are nearest to excavation tool 15 will need less preload, whereas the farthest ones will of course require a progressively increasing preload due to the increased weight of the downstream parts.

In order to generate and maintain the desired preload, one or more tensioning elements are inserted, such as, for example, tensioning axial spacers 45.

In order to be able to insert these tensioning axial spacers 45 it is necessary to use a system for stretching cable 16 that allows placing the tensioning elements between positioned spacers 3.

Said tensioning elements are preferably the tensioning axial spacers 45, cross members 42, spacers 3 and/or a combination thereof.

These tensioning axial spacers 45 will necessarily be open on one side, so that they can be properly inserted and embrace the two cable sections 16.

When they are positioned, cross members 42 can perform a function as preload spacers.

One method for preloading cable 16 provides for securing at least one terminal element (50, 51) or at least one cable gland 44 of the cable or tension line 16 as soon as cable 16 itself has been appropriately preloaded, while pulling either end thereof.

When said terminal elements and/or cross members 42 are used as tensioning elements, it is possible to eliminate the above-mentioned tensioning axial spacers 45 for preloading cables 16 in branches 4.

It is also possible to use the same spacers 3 as final tensioners, instead of inserting said cross members.

The techniques for pulling apart to spacers 3 and inserting the preloading elements are the following:
- the entire branch 4 is tensioned by anchoring one end to a fixed point and the other end to a pulling system capable of exerting forces greater than the required preload;
- retracting tools are used which set the two cross members 42 apart in order to leave the gap necessary for inserting suitable preload shims, e.g. tensioning axial spacers 45, and for creating the required work space;
- a pulling force is exerted on two adjacent spacers 3, between which tensioning elements are inserted, whether consisting of cross members 42, tensioning axial spacers 45, spacers 3 or other specially designed devices with calibrated thickness.

In one embodiment not shown in the drawings, said tensioning elements have such a shape that they can set apart adjacent spacers 3 so as to generate the desired preload; for example, they may be made up of two plates divided by an inclined plane, wherein a first element is inserted from below and a second element is inserted from above. During insertion, the inclined plane forces outwards and opens adjacent spacers 3, thus generating precompression. Advance is ensured, for example, by a screw-type fastening adjuster, which allows coupling the two elements until a final configuration of maximum tightening is achieved.

The preload on cable 16 ensures that the cable itself, when subjected to work loads, cannot stretch to such an extent as to create gaps between the spacer elements, since the load applied during the operating steps of drilling machine 1 is always less than, or at most equal to, the preload applied when mounting cable 16.

The various spacers 3 and cross members 42 stay always in contact with each other in the correct position, without spacers 3 being allowed to rotate or create gaps between themselves.

Cable 16 employed in the device according to the present invention is preferably a cable or tension line in a pre-stretched state, wherein the stretching proportional to a given axial load has a very small and easily controllable value.

In this preferred embodiment, therefore, considerable induced loads are obtained with reduced dimensions of the tensioning elements, thereby avoiding the problem of relaxation or loosening of cable 16 when the latter is subjected to a constant load.

In an exemplificative but non-limiting embodiment of the present invention, a pulley 14 is preferably mounted on the arm of the drilling machine 1 shown in FIG. 1, which pulley routes one or more hoses 22 for power lines 2, within which hydraulic hoses and/or at least one electric cable run.

The supporting and guiding device for power lines 2 is suitable for connecting said drilling machine 1 to excavation tool 15, and is driven by a drawworks 21, preferably a motorized one, installed on board rotary tower 12.

As an alternative to the machine shown in FIG. 1, it is possible to use a classic drilling machine with a vertical tower replacing lattice arm 13.

The excavation tool may be, for example, a hydromill which can be used for creating diaphragms having a rectangular/parallelogram section, or a similarly shaped tool, e.g. for mechanical mixing, as used in consolidation techniques for injecting cementing material.

Figure 3A:
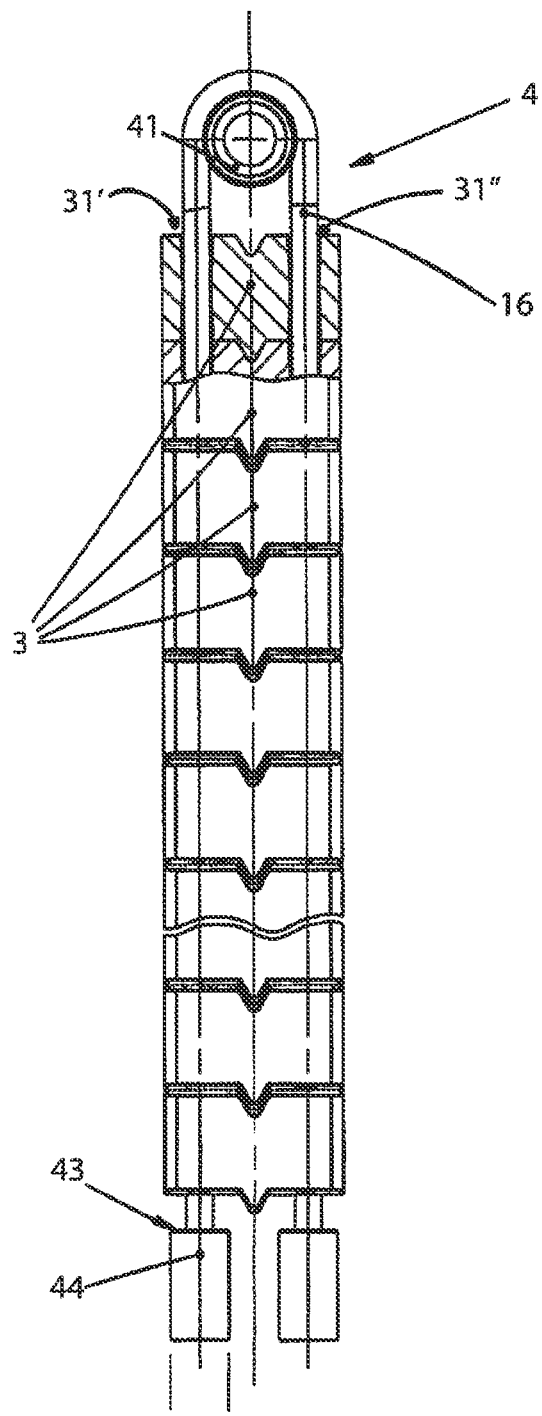
FIGS. 3A, 3B show different views of a supporting branch of the device; in particular.

In a first embodiment of spacers 3, shown in FIG. 3A, they comprise on their side faces at least two through housings 31, e.g. holes, which are used for routing the cable or tension line 16.

Spacer 3 according to the present invention is provided with at least one plane of symmetry, wherein said two through housings 31 are arranged parallel and symmetrical to the structure of spacer 3 itself. Advantageously, said housings 31 have the same diameter.

Figure 2A:
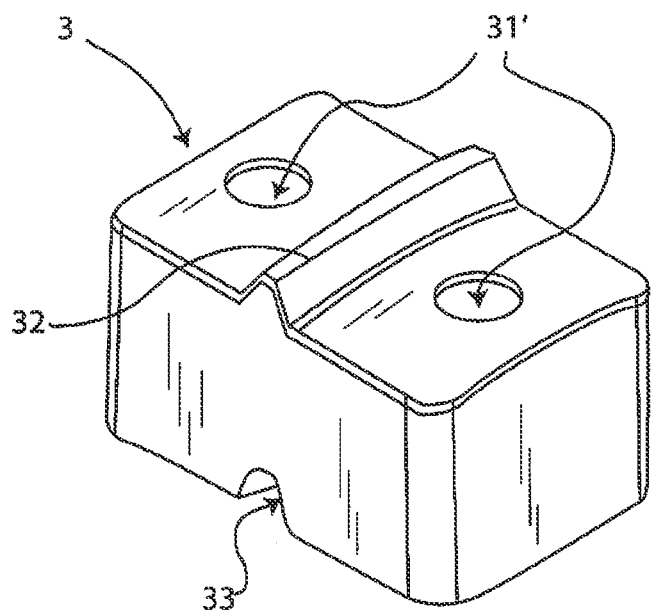
FIGS. 2A, 2B, 2C and 2D are three-dimensional views of the spacers; in particular.

In the embodiment of FIG. 2A, spacer 3 comprises at least one protuberance or tooth 32 and at least one recess 33 with matching shapes.

Said protuberance 32 and said recess 33 are arranged on opposite faces, e.g. on the side faces, thereby collaborating to keep the spacers integral with one another, once the cable 16 has been preloaded, when the device is positioned vertically in the excavation direction.

At least two faces of spacer 3 are curved, so as to allow the device according to the present invention to wind itself on circular drawworks 21; in particular, the side faces of spacer 3 crossed by housings 31 will be arched in order to ensure the possibility of getting wound by turning about the central plane.

Figure 2B:
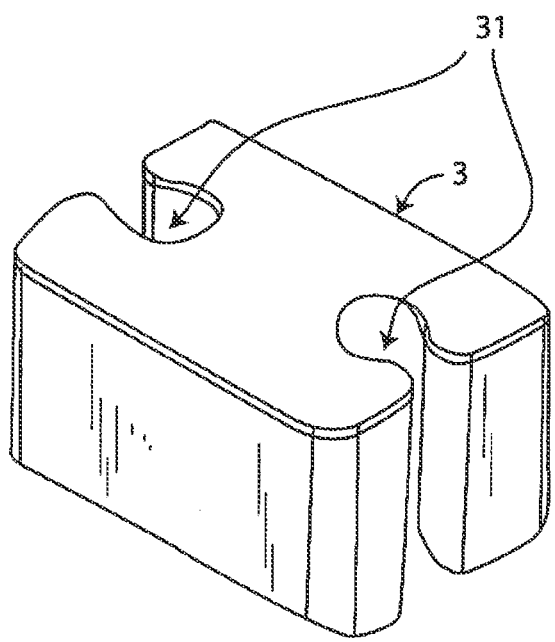

In a first variant of spacer 3, shown in FIG. 2B, through housings 31 are provided in the form of half-open side recesses.

This embodiment facilitates the installation of cables 16 by using a lateral aperture.

The minimum lateral opening of the recess of housing 31 is smaller than the nominal diameter of cable 16, so that the two appendices forming the recess perform the function of holding cable 16 within its seats in housings 31. Consequently, the cable is inserted into the recess by applying a light pressure onto it.

Figure 2C:
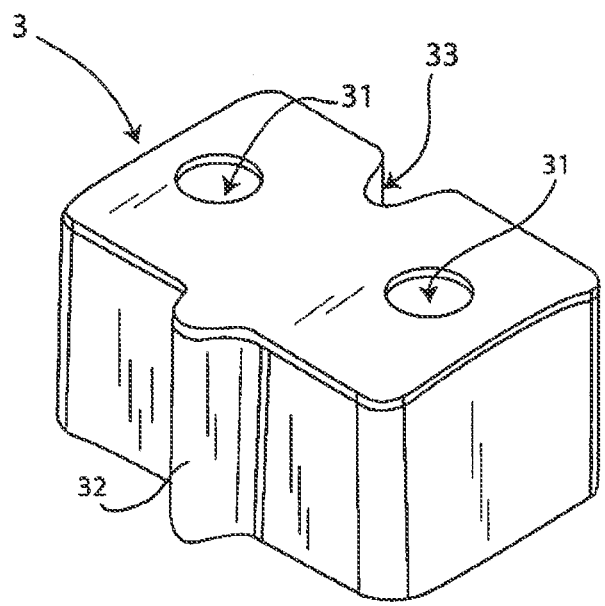

Protuberance or tooth 32 and recess 33 may alternatively be provided on the upper and lower faces of spacer 3, as shown in FIG. 2C.

In this latter embodiment of spacer 3, tooth 32 and recess 33 get coupled together as supporting branch 4 is wound by motorized drawworks 21. In this manner, spacers 3 corresponding to the different layers of the winding will be coupled together, thus providing an axial guide for further adjacent branch 4 to be wound.

In an embodiment not shown in the drawings, spacer 3 comprises several teeth and several recesses 33 arranged on appropriate faces, so as to improve the supporting and guiding capabilities of the device according to the present invention, both during the winding process and when the same device is positioned vertically on the excavation.

Figure 2D:
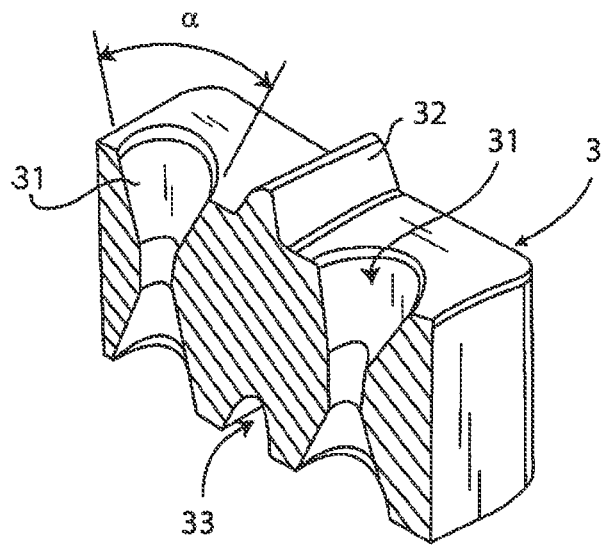

As shown in FIG. 2D, through housing 31 in which cable 16 is inserted advantageously has a tapered shape opening outwards, thus preventing cable 16 from coming in contact with the outermost corner of housing 31, once branch 4 has been wound on drawworks 21, by rotating relative to its previous configuration.

More in detail, the optimal opening angle "α" of housings 31 is, for example, comprised between 4° and 15°, 5° being the preferred value.

As can be seen in FIG. 3A, the cable or tension line 16 enters one branch 4 from below and crosses all spacers 3 in the length taken into account by passing through housings 31 on one side of the central plane, e.g. the right one, and then it turns about an idle pulley 41 to cross spacers 3 again in the reverse order by passing through housings 31 on the other side with respect to said plane.

Cable 16 thus creates a sort of closed loop by passing at least twice through every single spacer 3. Advantageously, the length of cable 16 is calibrated for obtaining a predetermined final length.

The number of spacers 3 and cross members 42 will be predetermined, and the axial dimension thereof will be such that at the end of the first mounting step, prior to preloading said cable 16, said dimension will advantageously turn out to be smaller than the distance existing between idle pulley 41 and the abutment shoulders 43 comprised in the terminal elements (50, 51) or in cable glands 44.

Preferably, said terminal elements (50, 51) and said cable glands 44 have an equivalent diameter which is greater than the diameter of cable 16 and of housings 31 of spacer 3.

Terminal elements 50 or 51 include idle pulley 41 adapted to allow cable 16 to create a closed loop.

Figure 3B:
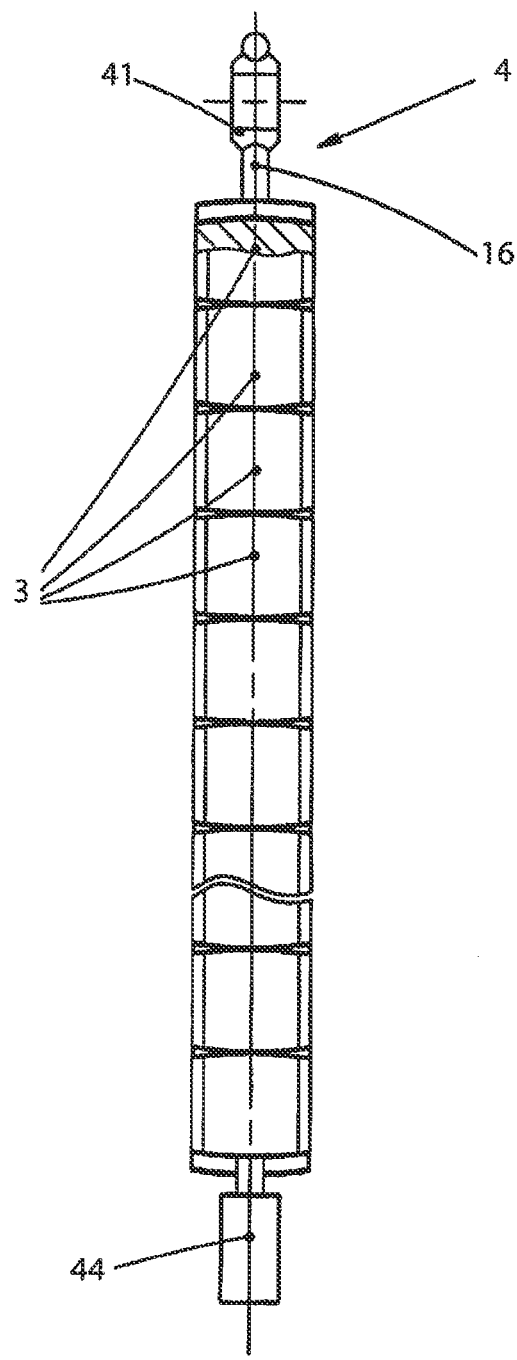

FIG. 3B shows a side view of the device of FIG. 3A which clearly illustrates the curved side surfaces of spacer elements 3 which, having to switch from the straight configuration to the curved configuration as they are wound on drawworks 21, will need a surface like the one shown in this drawing in order to be able to generate free rotation between contiguous elements and to ensure a proper coupling between various spacers 3.

Cable 16 will have a diameter such that the allowable load is at least equal to the operating load, i.e. the diameter of cable 16 and of the material thereof may be oversized by selecting models having higher characteristics than the minimum ones required, so as to minimize the stretching necessary for pre-loading by using axial spacers acting as tensioners.

Cable glands 44 will have an equivalent diameter greater than the cable, so that they cannot go through housings 31 of spacers 3.

Preferably, at least one of said terminal elements (50,51) is installed later, after cable 16 has been inserted through all spacers 3 along the intended path.

FIG. 4 shows a general view of a section of the device according to the present invention, which includes two supporting branches 4 arranged laterally and connected to each other by a plurality of cross members 42. Said cross members act as clamps holding hoses 22 containing the hydraulic hoses and sometimes also at least one electric cable.

Close to the cross members 42, a plurality of tensioning axial spacers 45 are installed for the purpose of ensuring continuity between spacers 3 and cross members 42. Said tensioning axial spacers 45 are adapted to generate the necessary preload on the cable or tension line 16 thanks to their axial length, i.e. their dimension along the longitudinal axis of cable 16.

If present on spacers 3, also tensioning axial spacers 45 feature at least one tooth or at least one recess, so that there are male axial spacers 451, comprising at least one tooth, and female axial spacers 452, comprising one recess, appropriately arranged in branch 4.

Said tensioning axial spacers 45, 451, 452 improve the alignment of the device according to the present invention and ensure adequate rigidity to avoid any rotation about the vertical axis of the elements that make up the device according to the present invention. Furthermore, since their axial thickness is not fixed, they can be built to generate a given value of slack take-up for the cable under the working load.

Advantageously, the tensioning axial spacers 45 are secured to cross members 42, preferably through removable means, e.g. screws inserted into holes 457, and have at least two housings 453 for cable 16, preferably in the form of open recesses. In this manner, thanks to housings 453, tensioning axial spacers 45 can also be inserted after cable 16 has been routed in a closed loop within spacers 3 of branches 4.

Two contiguous elements making up one supporting branch 4 are secured at their contiguous ends by means of terminal elements 50 or 51.

The connection of the elements making up one supporting branch 4 is made by means of a hinged element 441 that joins terminal elements 50 or 51.

Said hinged element 441 comprises, for example, hinges that allow relative rotation thereof, which is necessary when the supporting and guiding device is wound on drawworks 21.

A second alternative embodiment of the interconnection between the portions that make up one supporting branch 4 is shown in right-hand branch 4 of FIG. 4, wherein the connection between contiguous elements is obtained through terminal elements 51 and hinged element 441, which are also connected to each other through pins that provide suitable hinges.

The device according to the present invention allows the forces applied to power lines 2 to be discharged onto both cable sections 16 forming the closed loop.

Through spacers 3, it is ensured that cable or tension line 16, the diameter of which is constant and equal for both sections, will stretch to the same extent in both sections under any load which may occur in operation.

One alternative embodiment of the supporting and guiding device, which is suitable for excavations at reduced depths, comprises only one supporting branch 4.

In this latter embodiment, the cable 16 must be tensioned by inserting tensioning axial spacers between the two ends of branch 4, in particular between the first end of branch 4, connected to drawworks 21, and the second one, connected to excavation tool 15.

For greater excavation depths, it is preferable to use at least two branches 4, and each cable 16 comprised in each branch 4 must be preloaded by a value proportional to the equivalent load acting upon each section.

Figure 5A:
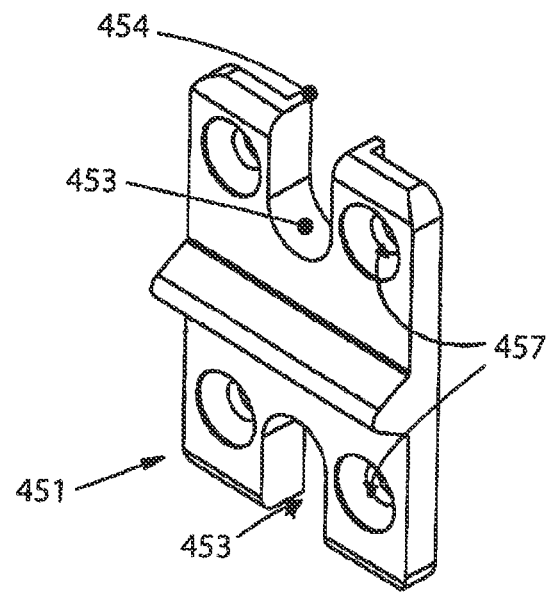
FIGS. 5A, 5B, 5C and 5D show different views of the tensioning elements; in particular.
Figure 5B:
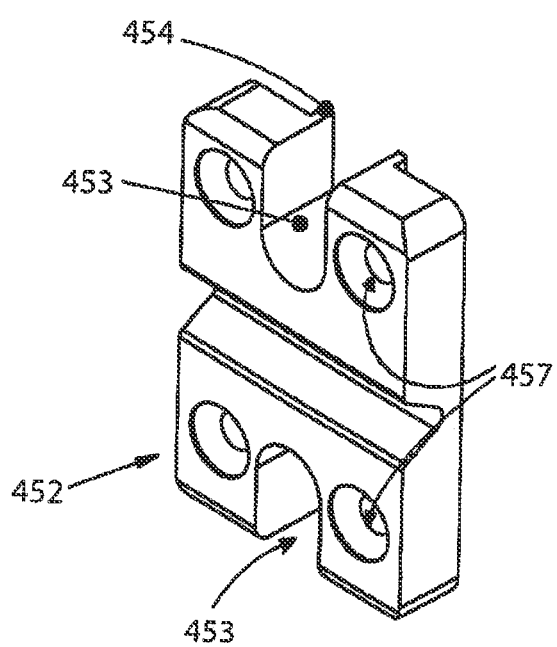

As shown in FIGS. 5A and 5B, each tensioning axial spacer 45 has at least one rear protuberance 454, which provides an axial reference with respect to cross member 42, thus ensuring that they are positioned safely and correctly. These tensioning axial spacers 45, mounted on a cross member 42, may alternatively be removable, e.g. for changing the preload of cable 16, for replacing a hose 22, or for carrying out other work required on the device according to the present invention.

Figure 5C:
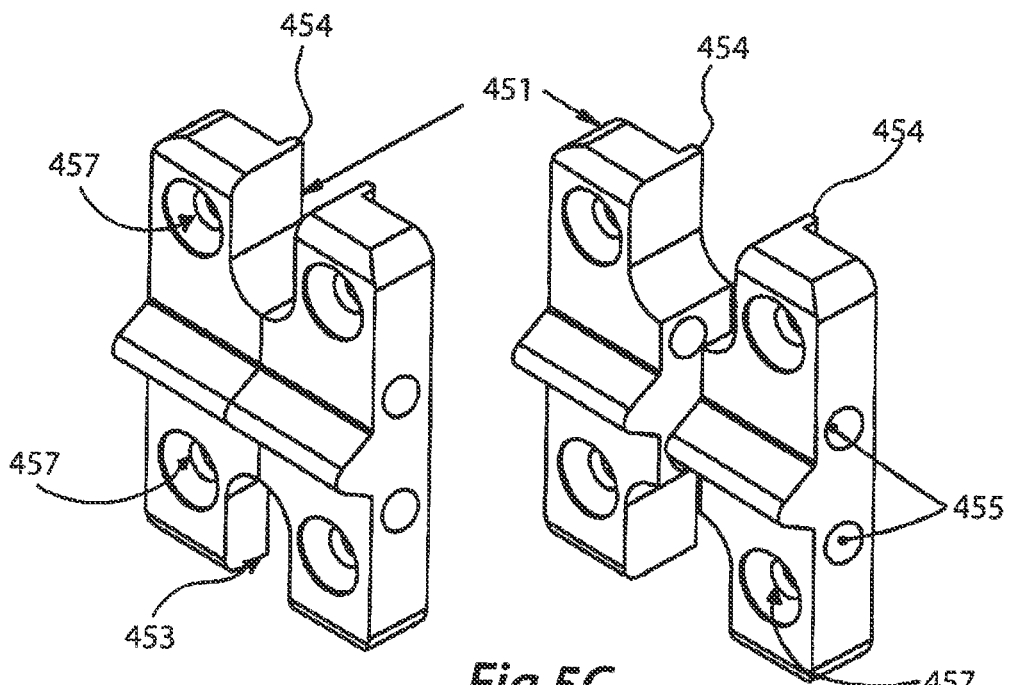
Figure 5D:
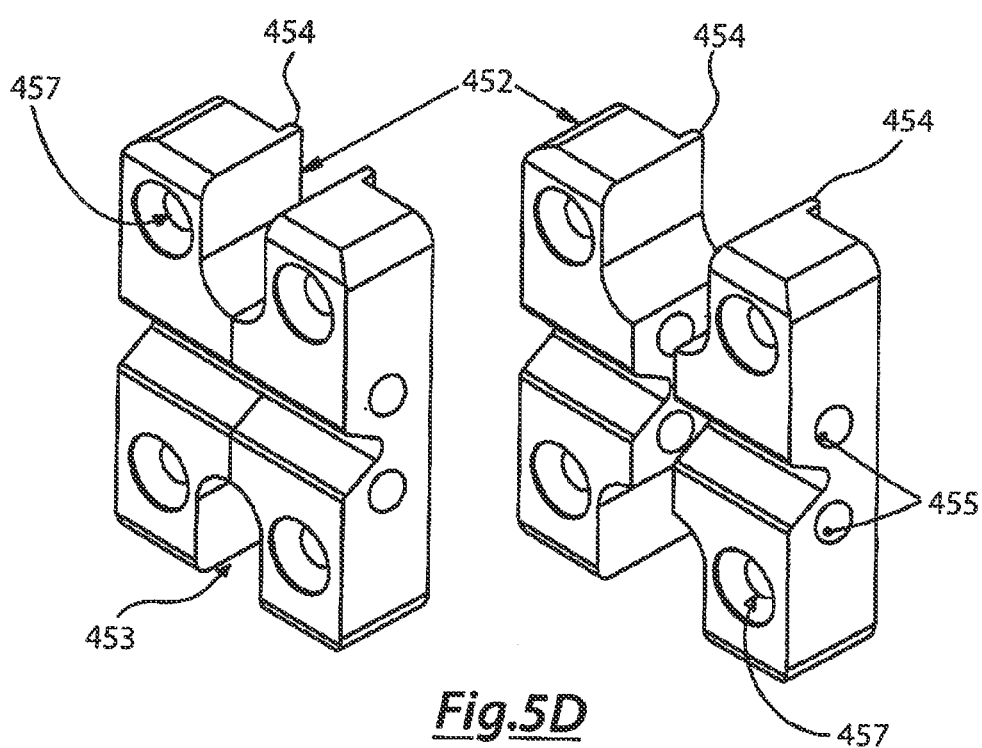

FIG. 5C illustrates an alternative variant of tensioning axial spacers 45 shown in FIGS. 5A and 5B.

Tensioning axial spacers 45 of FIG. 5C are divided into at least two parts, preferably right by housings 453 where cable 16 is placed. This measure allows securing beforehand the two halves of each tensioning axial spacer 45 to both sides of cross member 42, which are fastened to each other by means of fastening elements passing through holes 455.

Figure 6A:
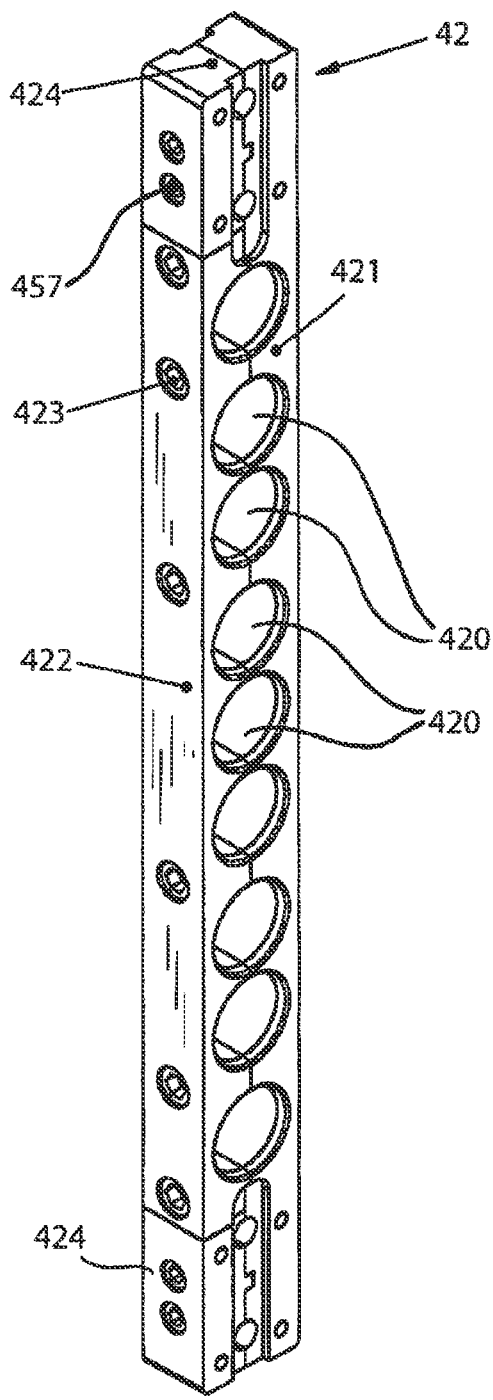
FIGS. 6A, 6B are three-dimensional views of a hose-carrying cross member; in particular.

FIG. 6A shows the detailed construction of cross member 42.

Said cross member 42 is advantageously made up of two portions, i.e. a first portion 421 and a second portion 422, so that it can be placed on hoses 22 for power lines 2 after same hoses 22 have been laid and the supporting branches have been assembled.

Once the mounting pitch has been defined, e.g. ten spacers 3 or twenty spacers 3, etc., cross members 42 are secured by positioning the first portion 421. After the first portion 421 has been inserted and hoses 22 have been properly positioned into respective housings 420, the second portion 422 is fastened by means of fastening elements 423, preferably removable ones, thus securing hoses 22.

The second portion 422 is also divided laterally, preferably into two dismountable side pieces 424, thus facilitating the removal of cross member 42 of supporting branches 4 that contain cable 16 without requiring the removal of entire cross member 42 in which hoses 22 are secured.

In some cases, wherein one branch, e.g. a side branch, needs to be replaced, it is possible to remove fastening elements 457 in the corresponding dismountable side pieces 424 of cross members 42 on the side corresponding to branch 4 to be removed.

In order to replace one branch portion 4, it is possible to remove all the dismountable side pieces 424 of the cross members concerned, thus releasing them from branch portion 4 that must be replaced.

In order to facilitate the connection and maintenance work to be carried out on branches 4 comprised in the supporting and guiding device according to the present invention, cross members 42 are conveniently installed in a manner such that the dismountable side pieces 424 are all concordant and facing the same plane.

According to a first method of disassembling a branch 4, or a portion thereof, branch 4 concerned is tensioned by loading the cable 16.

Cable 16 can be loaded by pulling apart spacers 3 and the tensioning axial spacers 45 adjacent to the cross member involved in the disassembly.

This stretching allows the personnel to work on the supporting and guiding device according to the present invention in absolute safety and with the necessary work space.

Figure 8A:
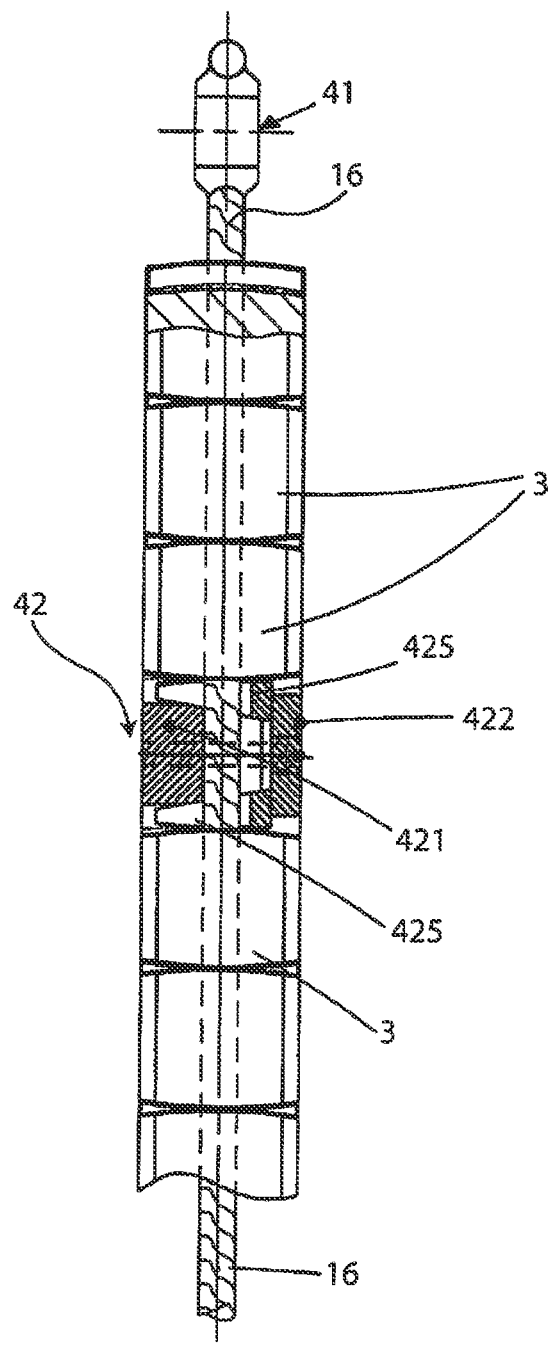
FIGS. 8A and 8B illustrate an alternative embodiment of the hose-carrying cross member; in particular.
Figure 8B:
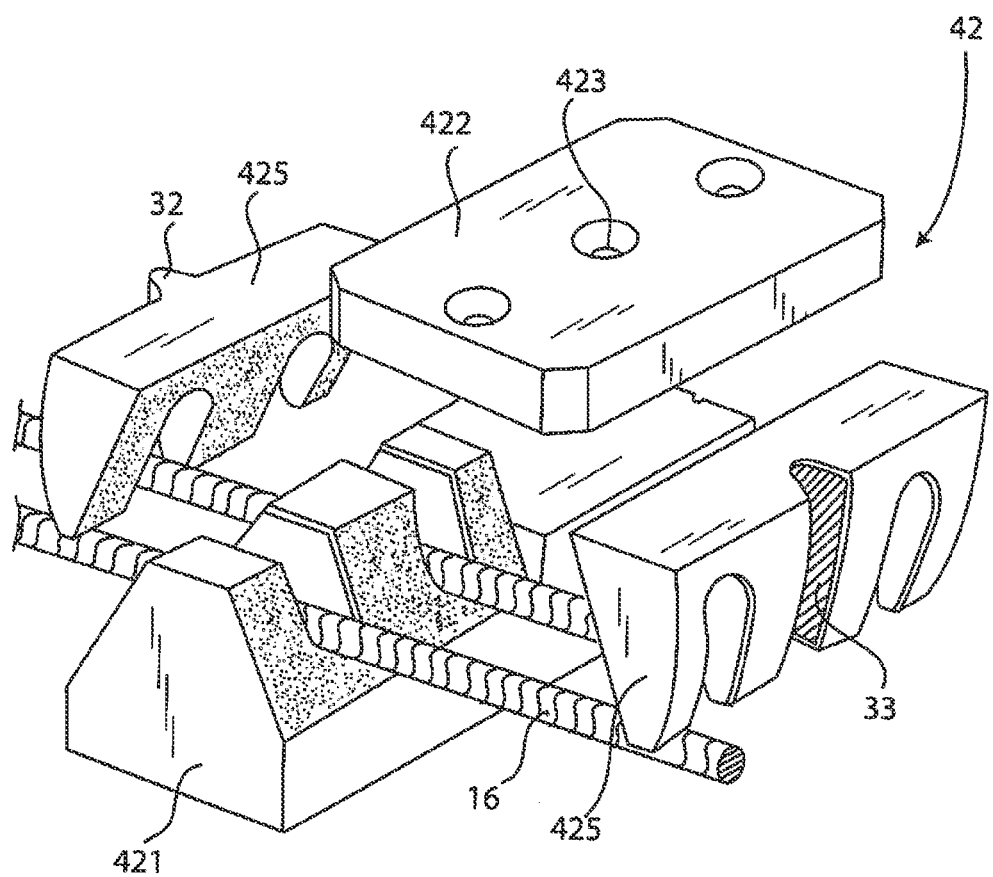

In an alternative embodiment of cross member 42, shown in FIGS. 8A, 8B, it has a wedge-like shape which is adapted to facilitate its insertion into branches 4, for the purpose of assembling the device with an adequate and adjustable preload value on cables 16.

In this solution, the first portion 421 of spacer 3 or of cross member 42 has a conical shape and includes at least two slots through which cables 16 are positioned.

Said cross member 42 or spacer 3, shown in FIGS. 8A, 8B, comprises at least two wedge-shaped elements 425, also provided with slots, which are pressed along the inclined planes of the first portion 421; the second portion 422 is then secured thereto by means of removable fastening elements (not shown) in wedge-shaped elements 425.

This phenomenon allows to adjust the distance between the external faces of wedge-shaped elements 425, thus allowing the preload of cables 16 to be calibrated as necessary.

In addition, the screw-type adjustment allows modulating the preload value, so that the minimum allowable preload can always be restored, even at a later time. If the cables get stretched permanently, the length variation under the working load will be greater, and this difference can be re-balanced by tensioning the screw-type adjuster, so as to increase the axial thickness of the spacer until the new condition required is achieved.

The housings obtained on wedge-shaped elements 425 and on the first portion 421 can be suitably shaped for securing cable 16. In this case, single sub-sections are isolated and can be made independent. For example, it is possible to block the tensioned cable with the desired preload by fastening the wedge-shaped elements against the first portion 421, so as to allow working on either one of the two sub-sections. By mounting one pair of these elements to a branch 4, the central section between them can be isolated in order to make the necessary maneuvers.

This solution also allows active control of the preload value, which can be varied as necessary in operation by acting upon the fastening elements to adjust the position of wedge-shaped elements 425.

Said wedge-shaped elements 425 comprise, without limitation whatsoever, at least one tooth or protuberance 32 and at least one recess 33, if spacers 3 have them as well.

Advantageously, the external profile of said wedge-shaped elements 425 as well as the external profile contacting spacers 3 are convex.

The solution proposed herein for making cross member is applicable to the making of spacers 3 and/or of tensioning axial spacers 45 installed on branches 4. In this variant, said elements will be installed as necessary to increase the preload value to be applied to cable 16 of branch 4; of course, due to balance reasons, similar elements will be installed on remaining branches 4, advantageously in the same axial position, so as to balance the loads.

Figure 6B:
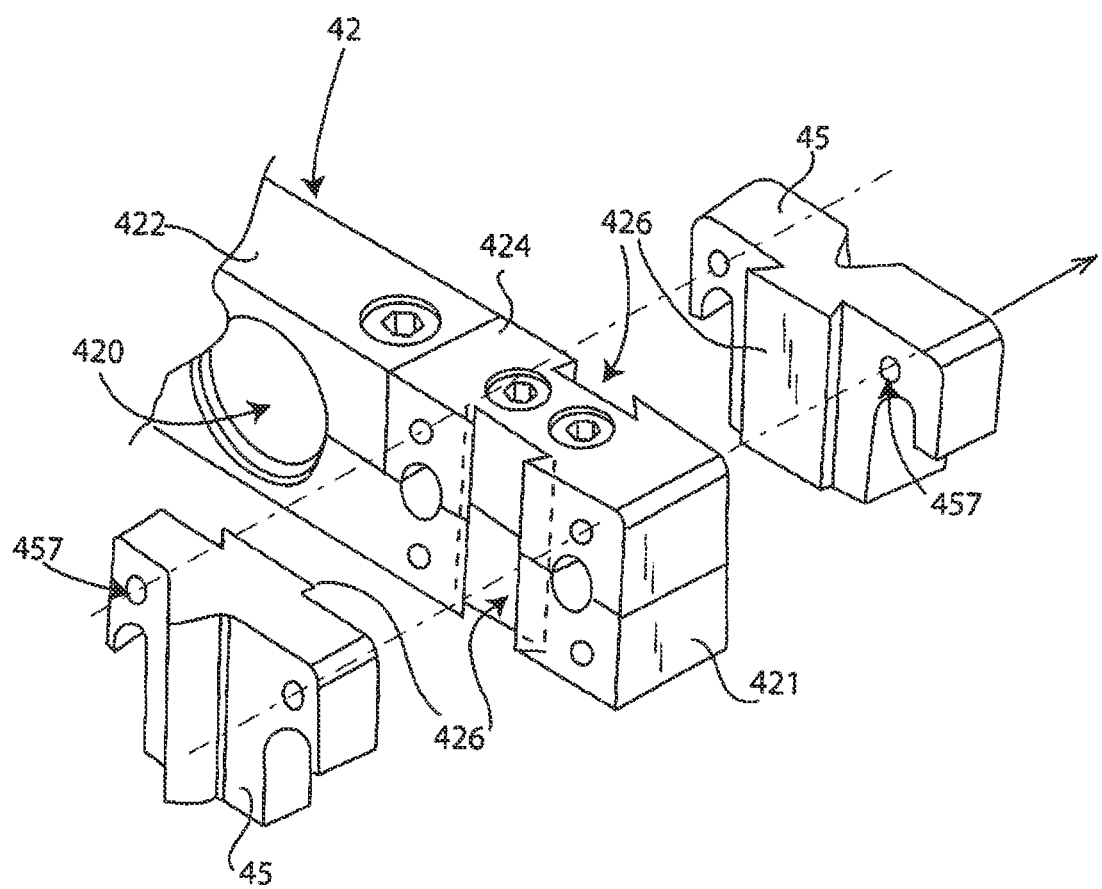

FIG. 6B illustrates a means for fastening tensioning axial spacers 45 to cross member 42. In this solution, the first and second portions (421, 422) of cross member 42 are provided with joint means 426, e.g. a dovetail joint, for engaging at least one tensioning element, e.g. a tensioning axial spacer 45, provided with joint means matching means 426.

In the embodiment shown in the drawings, the joint means 426 is, without limitation whatsoever, in the female configuration, and tensioning axial spacers 45 engage into it which are provided with joint means in the male configuration.

In an alternative embodiment, means for fastening are replaced with fastening means, e.g. screws.

Figure 7A:
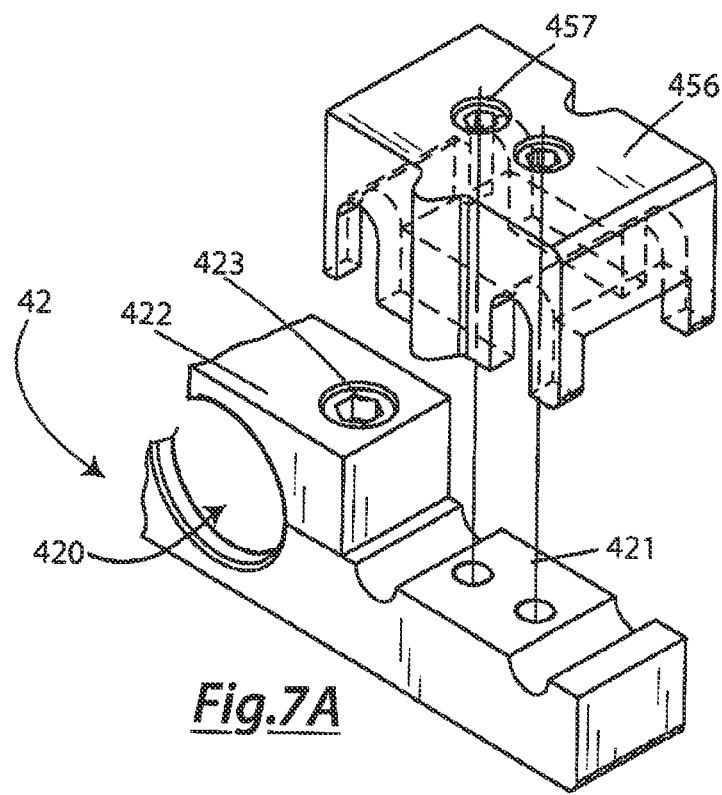
FIGS. 7A, 7B are three-dimensional views of an alternative to the cross member/tensioning element combination of FIG. 6B; in particular.
Figure 7B:
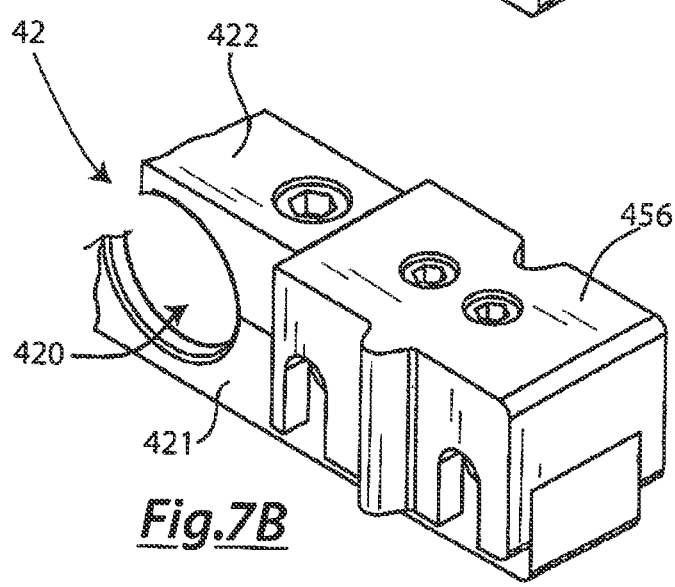

FIGS. 7A, 7B show an alternative embodiment of tensioning axial spacers 45. In the proposed solution, tensioning axial spacers 45, which are normally arranged on both faces of the cross member, and dismountable side piece 424 of cross member 42 are incorporated into a monolithic block 456, which performs the functions of both elements.

Said block 456, as shown in FIG. 7A, is laid, for example, over the ends of cross member 42 to tension cables 16, positioning itself between spacers 3 which are contiguous to each cross member 42.

Said blocks 456 have predefined calibrated dimensions and are adapted to eliminate any play between tensioned spacers 3. Block 456 comprises a recess in the lower portion, the width of which is substantially equal to the width of the first portion 421 of the cross member 42.

For the purposes of the present invention, "substantially equal" means that the width is such that the play between the parts is minimal, thus allowing the connection therebetween.

Said block 456 is secured to the first portion 421 of cross member 42 through removable fastening means.

Figure 9A:
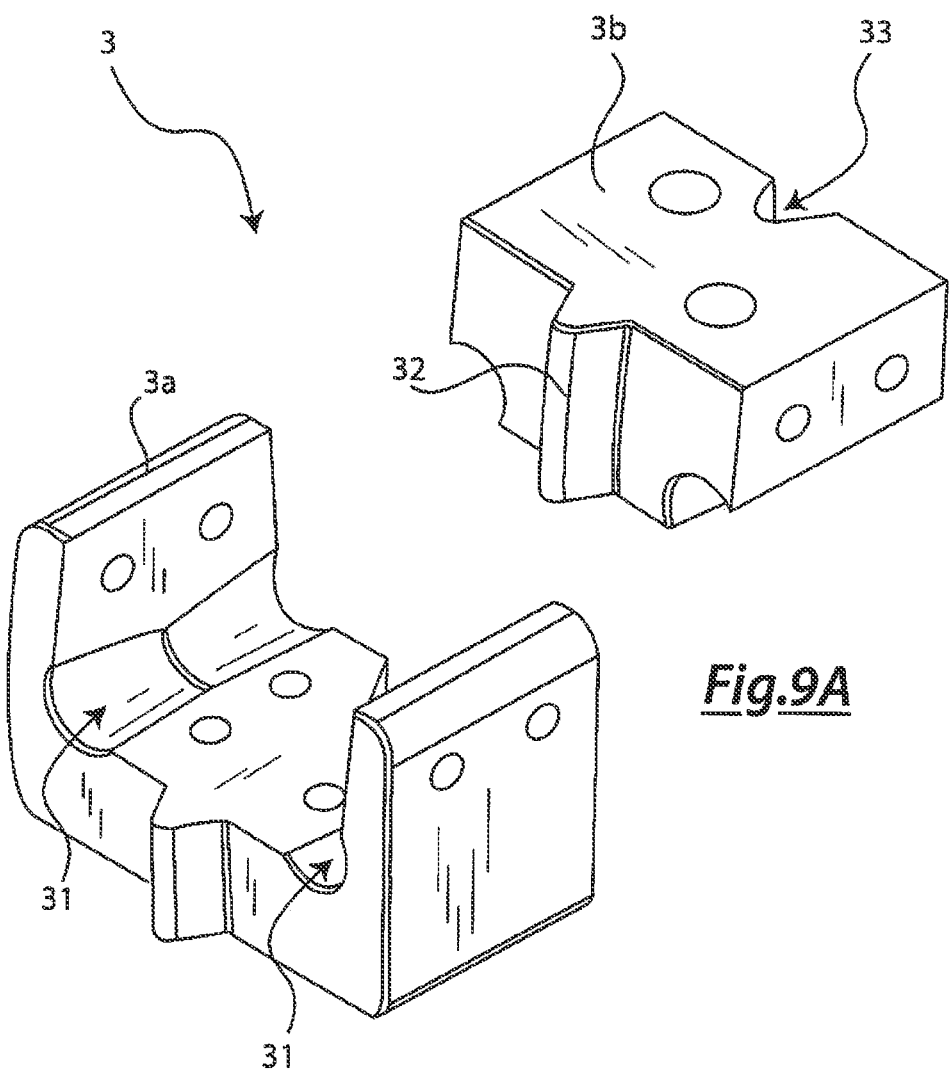

FIGS. 9A, 9B illustrate alternative embodiments of spacers 3, which are made up of two parts having complementary shapes, i.e. a lower part 3a and an upper part 3b, which are adapted to be combined together into a single assembly by means of interlocking portions.

The lower part 3*a* substantially has a "C" shape e comprises the half recesses of the housings 31, where cables 16 are inserted, as well as the fastening elements for securing the matching upper part 3*b*.

Upper part 3*b* is adapted to enclose cable 16 when combined with lower part 3*a* into a single assembly.

These embodiments, shown in FIGS. 9A, 9B, allow cables 16 to be preloaded more easily, in that one can first insert all spacers 3 and then, in suitable predetermined positions, insert lower part 3*a* with cable 16, which can finally be joined to upper part 3*b* in a simple and quick manner.

FIG. 9B shows another variant of upper and lower parts 3*b*, 3*a*, wherein the interlocking portion is of the dovetail type.

The proposed invention allows solving the main problems suffered by the solutions known so far in the industry. In particular, spacers 3 can never get separated from each other, in that cable 16 of each branch 4 is preloaded with a load at least equal to, or preferably greater than, the one it will normally be subjected to in operation during the working or handling steps.

The preload value is estimated by knowing all the weight to which the single sections that constitute power lines 2 are subjected, the weight of every single branch 4, and the loads normally present in known applications like those described herein.

Preferably, the first section of supporting branch 4, i.e. the one closest to drawworks 21, will be preloaded with a very high preload value, greater than that of the other sections of branch 4 which are closer to excavation tool 15; in fact, said value decreases as excavation tool 15 is approached.

Furthermore, cable 16 passing at least twice through spacers 3 prevents the spacers from turning from their the predetermined position.

The two cable sections 16 that cross each spacer 2 belong to the same cable 16, and therefore they have the same diameter, thus advantageously ensuring that both cable sections 16 are equally loaded; this also prevents supporting branch 4 from deflecting in the plane that contains the two cable sections 16.

In practice, both cable sections 16 perform the same functions as supports for power lines 2, as guides for spacers 3, and as anti-rotation devices for the same spacers 3.

The load is distributed onto both cable sections 16, allowing the use of a cable 16 having a smaller diameter than the prior-art solution that uses a supporting cable coupled to a guiding cable.

The thickness of spacers 3 and of cross members 42, which are run through by cable 16, is slightly greater than that of hoses 22; this allows installing on board the machine a drawworks 21 having smaller dimensions and weight compared to the solutions known in the art. This is possible because the supporting and guiding device, which comprises power lines 2, is thinner and takes up less space when it is wound on the drum of drawworks 21.

According to an alternative embodiment of the supporting and guiding device described herein, branches 4, or at least one section thereof, are placed in an internal position, instead of being arranged near the side ends; also, a further variant is represented by a single central branch 12 with hoses 22 arranged at the side ends of the device.

Finally, in an alternative embodiment cable 16 passes only once through one housing 31 included in each spacer 3, without said spacer being allowed to rotate thanks to the tensioning of said cable 16. In addition, by using spacers 3 comprising abutment elements such as, for example, teeth or protuberances 32 and recesses 33, said spacers are held in a predetermined position without being allowed any relative rotation.

Cable 16 is advantageously of the anti-rotation type, so as to avoid that during the tensioning process it may turn on itself and cause rotation of spacers 3.

Said cable is advantageously pre-stretched, so that plastic yielding has already occurred when first installation takes place. This allows to foresee with certainty the length of cable 16 in operating conditions and in idle conditions, thereby allowing for an accurate selection of the tensioning spacers to be inserted.

In any case, given the modularity of this solution, theoretical values can be replaced with operational ones, by changing sizes and numbers of the tensioning spacers or by properly adjusting them, if they are of the type shown in FIGS. 8A and 8B.

Of course, the supporting and guiding device may be subject to other construction variations, which will nonetheless still fall within the basic principles of the invention.

The invention claimed is:

1. A supporting and guiding device for power lines for use in association with an excavation tool mounted on a drilling machine; said supporting and guiding device being adapted for assuming a plurality of different operating configurations; said device comprising:
   two supporting branches, each of the supporting branches including:
      a plurality of, spacer elements, each of the spacer elements comprising at least two through holes;
      a cable or tension line inserted into said at least two through holes in said spacer elements;
      said power lines comprising at least one supply hose;
      at least one cross member, comprising at least one through housing for supporting the at least one supply hose, connected to said supporting branches;
      wherein each of said supporting branches comprises at least one tensioning element; and
      wherein the cable of each of the supporting branches passes through each of the spacer elements by passing through two of the through holes to form a closed path and the cable is subjected to a preload generated by insertion between two adjacent ones of the spacer elements of at least one tensioning element, the cable having a sufficient axial length such that all of the spacers crossed by said cable are kept in a state of contact with each other in all operating configurations.

2. The device according to claim 1, wherein the spacers comprise at least one protuberance and at least one recess with matching shapes arranged on opposite sides of each of the spacer elements.

3. The device according to claim 1, wherein the tensioning element is the cross member, which preloads the cable.

4. The device according to claim 1, wherein the tensioning element is made from at least one tensioning axial spacer installed close to at least one cross member.

5. The device according to claim 1, wherein:
   each of said branches comprises at least one terminal element or at least one cable gland; and
   the preload is imposed on the cable by fixing at least one terminal element or at least one cable gland to the cable or tension line.

6. The device according to claim 1, wherein the spacer is divided into a lower part and an upper part having complementary shapes, wherein said lower part and said upper part are combined together into a single assembly by interlocking portions.

7. The device according to claim 1, wherein the at least one cross member comprises a first portion and a second portion fastened to each other by fastening elements.

8. The device according to claim 7, wherein the second portion comprises at least one dismountable side piece for facilitating disassembly of the cross member from the supporting branch.

9. The device according to claim 6, wherein the joint between the lower part and the upper part comprises a dovetail type joint.

10. The device according to claim 8, wherein:
the first and second portions of the cross member have a first joint;
said at least one tensioning axial spacer is equipped with a second joint, the second joint matching the first joint.

11. The device according to claim 3, further comprising tensioning axial spacers and dismountable side pieces, wherein the tensioning axial spacers and the dismountable side piece are incorporated into a single monolithic block which performs the functions of both elements.

12. The device according to claim 1, wherein said tensioning element has a conical shape and includes at least one slot into which the cable is positioned, said tensioning element further comprising:
a first portion comprising two inclined planes; and
at least two wedge-shaped elements provided with slots, wherein the wedge-shaped elements are pressed along said inclined planes of the first portion to calibrate stretching of the cable.

13. The device according to claim 12, wherein the wedge-shaped elements and the first portion are shaped to secure said at least one cable.

14. The device according to claim 1, wherein the cables or tension lines are in a pre-stretched state.

15. A supporting and guiding device for power lines for use in association with an excavation tool mounted on a drilling machine; said supporting and guiding device being adapted to assume different operating configuration;
said device comprising:
two supporting branches; each of the supporting branches including:
a plurality of spacer elements, each of the spacer elements comprising at least one through hole;
a cable or tension line, wherein said cable or tension line is inserted into said at least one through hole in said spacer elements;
said power lines comprising at least one supply hose;
at least one cross member, comprising at least one through housing for supporting said at least one supply hose, connected to said supporting branches;
wherein each of said supporting branches comprises at least one tensioning element;
wherein the cable of each supporting branch passes through each of the spacer elements and said cable is subjected to a preload generated by insertion between two adjacent ones of the spacer elements of at least one tensioning element, the cable having a sufficient length such that all of the spacer elements crossed by said cable are kept in a state of contact with each other in all operating configurations; and
wherein said tensioning element is the cross member, the cross member being configured to preload the cable.

16. A supporting and guiding device for power lines for use in association with an excavation tool mounted on a drilling machine; said supporting and guiding device being adapted to assume different operating configuration;
said device comprising:
two supporting branches; each of the supporting branches including:
a plurality of spacer elements, each of the spacer elements comprising at least one through hole;
a cable or tension line, wherein said cable or tension line is inserted into said at least one through hole in said spacer elements;
said power lines comprising at least one supply hose;
at least one cross member, comprising at least one through housing for supporting said at least one supply hose, connected to said supporting branches;
wherein each of said supporting branches comprises at least one tensioning element;
wherein the cable of each supporting branch passes through each of the spacer elements and said cable is subjected to a preload generated by insertion between two adjacent ones of the spacer elements of at least one tensioning element, the cable having a sufficient length such that all of the spacer elements crossed by said cable are kept in a state of contact with each other in all operating configurations; and
wherein the tensioning element is made from at least one tensioning axial spacer installed proximate to at least one cross member.

* * * * *